United States Patent [19]
Nakashima et al.

[11] Patent Number: 5,582,281
[45] Date of Patent: Dec. 10, 1996

[54] METHOD OF CONNECTING A SLIDING MEMBER TO A SYNCHRONIZER RING

[75] Inventors: Kunio Nakashima; Masao Hosoda; Kunihiro Uraki; Wataru Yago; Atsushi Yasukawa, all of Toyama-ken, Japan

[73] Assignee: Chuetsu Metal Works Co., Ltd., Toyama, Japan

[21] Appl. No.: 277,171

[22] Filed: Jul. 19, 1994

[51] Int. Cl.⁶ .......................... F16D 69/04; F16D 69/02; C22C 9/04
[52] U.S. Cl. ....................... 192/107 M; 148/532
[58] Field of Search ................ 192/107 M; 148/532, 148/536, 649, 680; 420/478, 479

[56] References Cited

U.S. PATENT DOCUMENTS

| | | | |
|---|---|---|---|
| 2,359,361 | 10/1944 | Gleszer et al. | 192/107 MX |
| 2,362,007 | 11/1944 | Hensel et al. | 192/107 MX |
| 2,490,548 | 12/1949 | Schultz | 148/536 X |
| 4,597,484 | 7/1986 | Takeguchi et al. | 192/107 MX |
| 4,940,847 | 7/1990 | Gramberger | 192/107 MX |
| 4,943,321 | 7/1990 | Akutsu | 192/107 MX |
| 5,249,661 | 10/1993 | Kawamura et al. | 192/107 M |
| 5,288,683 | 2/1994 | Nakashima et al. | 192/107 MX |
| 5,326,646 | 7/1994 | Nakashima et al. | 428/561 |
| 5,337,872 | 8/1994 | Kawamura et al. | 192/107 M |

*Primary Examiner*—Rodney H. Bonck
*Attorney, Agent, or Firm*—Flynn, Thiel, Boutell & Tanis, P.C.

[57] ABSTRACT

In a synchronizer ring that is a part of an automobile transmission, a ring body is made of an iron material and a sliding member is made of a wear-resistant copper alloy having the following chemical components, matrix and rigidity, characterized in that the ring body and sliding member are bonded to each other by way of hot working. (1) a wear-resistant copper alloy containing Zn of 22 to 45 wt %, at least one kind of metal elements of 0.1 to 15 wt % which are selected from a metal element group of Al, Mn, Fe, Pb, Ni, Be, Si, Co, Cr, Ti, Nb, V, Zr, Mo, Sn, Bi, B etc. and the remnant composed of Cu and impurities. (2) The wear-resistant copper alloy has a matrix of α phase+β phase, β phase alone or β phase+γ phase. (3) HRB (Hardness Rockwell B) value is more than 80. As a result, it is possible to provide a high performance composite-material synchronizer ring capable of sufficiently withstanding a high load since it comprises a ring body made of an iron material which is superior in rigidity and strength and a wear-resistant copper alloy material bonded to the sliding surface side of the ring body by way of hot working such as hot forging and the like.

9 Claims, 3 Drawing Sheets

5,582,281

METHOD OF CONNECTING A SLIDING MEMBER TO A SYNCHRONIZER RING

BACKGROUND OF THE INVENTION

1. Field of the Invention

This invention relates to a method of connecting a wear-resistant copper alloy to a synchronizer ring (sometimes simply called as "a synchro" for short) body made of an iron material as a sliding member and which is adapted for use in transmissions of vehicles and the like.

2. Description of the Prior Art

Synchronizer rings solely made of a copper alloy are in general use. However, the recent increase of power and torque in passenger cars or the recent use of high power gear shifts with hydraulic servo units in large-sized vehicles such as trucks, buses and the like applies a larger load to the synchronizer ring so that a synchronizer ring made solely of a copper alloy has become insufficient in the wear resistance of a chamfering hob therein or in the whole rigidity and strength thereof since a high load is applied thereto at the time of shifting gears although it is sufficient in wear resistance at the sliding surface thereof.

Accordingly, there have been three kinds of heavy-duty synchronizer rings, each having a wear-resistant part bonded to the sliding portion thereof as follows:

(1) A synchronizer ring in which an iron material is spray-coated with Mo.

(2) A synchronizer ring in which an iron material is coated with a resin (e.g. phenol resin)

(3) A synchronizer ring in which a wear-resistant material is mechanically bonded to an iron material.

The method (1) which is widely employed by large-sized vehicles etc. causes a high cost since the sliding material Mo is very expensive.

The method (2) generates a change depending on the temperature of use in synchronizing performance that is most important to the synchronizer ring. Under some conditions of use, the sliding surface of the synchronizer ring sometimes instantaneously becomes over 300° C. to melt the resin so that the function of the synchronizer ring is liable to deteriorate. On the other hand, when it is used at a low temperature, the lubricant oil becomes so viscid that it cannot be removed from the sliding portion completely, prolonging the period for synchronization and generating gear noise. As a result, the available range of temperature is limited.

Methods of fixing the sliding material to the ring body by way of screws and caulking are known in method (3).

FIG. 7 shows how to bond a Borg-Warner synchronizer ring body 21 and a member having a sliding surface (referred to as a sliding member hereinafter) 22 to each other by way of a screw 23. This method, however, has a problem in mounting strength due to the mechanical bonding and it is obvious that it is disadvantageous in cost since it requires a large number of parts and assembling processes, and the strict quality control and dimensional accuracy of each part. Moreover, since the screw mounting portion has no sliding material, it is difficult to secure a contact area thereon, so that it is disadvantageous in performance. Furthermore, it is very difficult to attach the sliding member 22 to a synchronizer ring having a small diameter. In FIG. 7, denoted at 24 is a hub sleeve and 25 is a gear cone.

FIG. 8 shows a method of bonding a pin synchronizer ring 26 and a sliding member 27 to each other by way of caulking protrusion 28. A copper alloy material which can be used for caulking is generally made having a low rigidity for securing ductility so that it is liable to be inferior in wear resistance, and deemed to have no sufficient synchronous performance.

Moreover, caulking is classified into press fitting, shrink fitting and expansion fitting, among which press fitting causes seizure or galling at the time of engaging one in the other. On the other hand, shrink fitting and expansion fitting are liable to cause the drop off of the sliding member from the ring body when the working temperature becomes high or low since they take advantage of elastic deformation accompanied by thermal expansion or thermal contraction for bonding. Furthermore, since all of the above three methods bond them to each other in a state wherein one is engaged in the other, interference is as short as ³⁄₁₀₀ of the diameter at the most, so that securing dimensional accuracy requires a precision machining at a high cost. Still furthermore, since they can be separated by a small force, these methods are not adapted for large-sized vehicles which generate a large torque.

There is another method of bonding wear resistant materials to the ring body by way of brazing. Since temperatures often reach a high temperature of over 600° C. at bonding portions in brazing, the ring body is liable to distort to cause a precision problem. It is also very difficult to work with hands in a limited space of a synchronizer ring.

The present invention has been made from the problems set forth above to provide a synchronizer ring of heavy duty operation and high performance by bonding a specially selected wear-resistant copper alloy material to the sliding member of the ring body by way of hot working.

SUMMARY OF THE INVENTION

To achieve the above object, the present invention provides a synchronizer ring that is a part of an automobile transmission wherein a ring body is made of an iron material and a sliding member is made of a wear-resistant copper alloy having the chemical components, matrix and rigidity described later, characterized in that the ring body and the sliding member are bonded to each other by way of hot working.

(1) a wear-resistant copper alloy containing Zn of 22 to 45 wt %, at least one metal of 0.1 to 15 wt % which is selected from a metal group of Al, Mn, Fe, Pb, Ni, Be, Si, Co, Cr, Ti, Nb, V, Zr, Mo, Sn, Bi, B etc. and the remainder being Cu and impurities.

(2) The wear-resistant copper alloy has a matrix of α phase+β phase, β phase alone or β phase+γ phase.

(3) HRB (Hardness Rockwell B) value is more than 80.

The wear-resistant copper alloy also may contain Al of 3 to 15 wt %, at least one kind of metal elements of 0.1 to 15 wt % which are selected from a metal element group of Zn, Mn, Fe, Pb, Ni, Be, Si, Co, Cr, Ti, Nb, V, Zr, Mo, Sn, Bi, B etc. and the remnant composed of Cu and impurities.

If the ring body is subjected to roughening, e.g. forming a wave pattern at the portion thereof bonded to the sliding member, it is possible to improve the bonding strength between the ring body and the sliding member. Moreover, if the ring body is equipped with notched portions, it is also possible to improve the bonding strength therebetween similarly or better.

In case the synchronizer ring is of a Borg-Warner-type or keyless-type having a sliding member on the internal circumference thereof, if the ring body and sliding member are bonded to each other by individually setting respective optimal hot working temperatures for the iron material of the ring body and the wear-resistant copper alloy of the sliding member to substantially equalize the expansion amounts thereof in a non-oxidizing atmosphere such as $N_2$, Ar, etc. and subjecting them to hot working, it is possible not only to completely prevent the drop off at the time of cooling but also to further increase the bonding strength therebetween. The heating temperature of the wear-resistant copper alloy material is set to be optimal within a range of 600° to 900° C. in most cases.

As to the hot working, there are extruding, drawing out, shearing, bending and the like, except the hot forging set forth above, either of which can be employed by the invention.

The reason why the chemical ingredients and the contents thereof are specified as above for the wear-resistant copper alloy will be described hereinafter.

Brass materials which are copper alloys mainly composed of Cu—Zn are superior in malleability and strength. Aluminum-bronze materials, which are copper alloys mainly composed of Cu—Al, are superior in strength, corrosion resistance and wear resistance. Improving copper alloys in wear resistance requires adding various elements thereto to precipitate intermetallic compounds. Improper addition, however, has no effect on wear resistance (in case of insufficient addition), or forms hard spots to deteriorate workability without further improvement in wear resistance as the intermetallic compounds become saturated (in case of excessive addition). Accordingly, the content of metal elements described above are for securing the optimal wear resistance.

The reason why the matrix is specified is as follows.

In order to improve the wear resistance of copper alloys, there is a method of increasing the rigidity of the copper alloys themselves other than specifying the chemical ingredients. The present invention employs chemical ingredients capable of forming a high rigidity copper alloy of β phase instead of low rigidity copper alloy of α phase alone and moreover secures rigidity to improve wear resistance by a matrix of α phase+β phase, β phase alone and β phase+γ phase, the γ phase of higher rigidity being precipitated.

Incidentally, a value of HRB (Hardness Rockwell B) less than 80 is insufficient for wear resistance and it is necessary to be more than 80 for attaining the object of the invention.

The synchronizer ring according to the present invention comprises a ring body made of a highly rigid and very strong iron material and a wear-resistant copper alloy material, which is superior in sliding characteristics, bonded to the sliding surface of the former by way of hot working such as hot forging etc. so that it is possible to provide a high performance composite-material synchronizer ring capable of sufficiently withstanding a heavy load.

Since hot working is employed, the process can cover a bonding and forming processes. Moreover, it is possible to fabricate the synchronizer ring irrespective of its size. If iron and copper alloy metals are forged and bonded to each other at normal temperatures, the copper alloy material cracks because of the lack of ductility thereof. Accordingly, cold working cannot be applied thereto. Furthermore, even if a material of a phase alone is employed for securing the ductility of the copper alloy material, it is low in rigidity to cause a problem in wear resistance.

Copper is larger than iron in thermal expansion coefficient, so iron is heated at an optimal temperature higher than that of copper to bond them to each other in such a way as to obtain substantially the same amount of shrinkage in both of the metals at normal temperatures.

This method is effective particularly to Borg-Warner-type or keyless-type synchronizer rings having a sliding member on the internal circumference thereof for preventing the sliding member thereof from dropping off and for obtaining a large bonding strength.

Still furthermore, it is possible to provide a synchronizer ring further improved in bonding strength by providing a rough surface or notched portions on the ring body at the portion thereof bonded to the sliding member.

BRIEF DESCRIPTION OF THE DRAWINGS

FIGS. 1(a) and 1(b) show a pin-type synchro according to the present invention, wherein FIG. 1(a) is a cross-sectional view of an essential part thereof and FIG. 1(b) is a plan view thereof;

FIGS. 4(a) and 4(b) are views for explaining a hot forging method for a pin-type synchro, wherein FIG. 4(a) is a cross-sectional view thereof for explaining the method before forging and FIG. 4(b) is that after forging;

PREFERRED EMBODIMENT OF THE INVENTION

Test specimens used in the examples of the present invention and specimens for comparative examples (including conventional one) are shown in table 1. Synchronizer rings according to the embodiments of the invention are shown in FIGS. 1, 2 and 3, each synchronizer ring being formed by various methods described hereinafter and subjected to various tests with reference synchronizer rings.

Figure 1A:
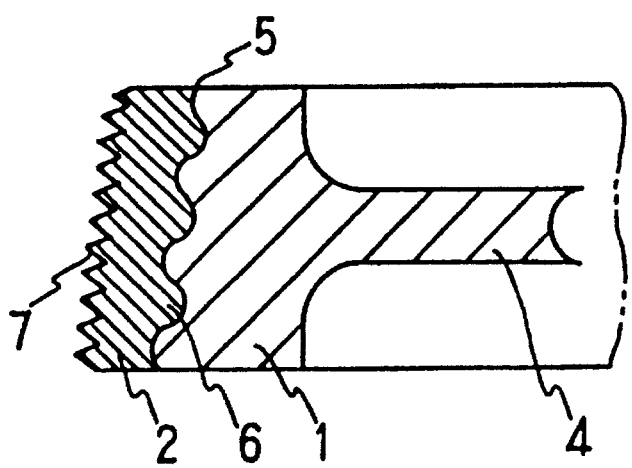
Figure 1B:
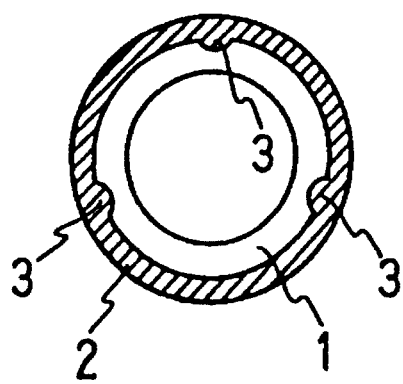

FIG. 1 shows a pin-type synchronizer ring according to an embodiment of the present invention. The pin-type synchronizer ring is a synchronizer ring having a sliding member on the external circumference thereof, the ring body and the sliding member being fixed to each other by a spring inserted in the internal empty portion thereof, wherein FIG. 1 (a) is a cross-sectional view of an essential part of the synchronizer ring according to the invention and FIG. (b) is a plan view thereof. In the figures, denoted at 1 is a ring body, 2 is a sliding member, 3 are notched portions and 4 is a pin-type spring. The ring body 1 is made an iron material, e.g., JIS G 4104 SCr-415 material, while the sliding member 2 is made of a wear-resistant copper alloy material, e.g., a specimen B disclosed in Table 1. Denoted at 7 is a threaded land portion formed on the surface of the sliding member. The ring body I has a waveform-roughened surface 6 thereon at the portion 5 thereof bonded to the sliding member, and is further provided with notched portions 3 thereon to improve the bonding strength between the body and sliding member as illustrated in FIG. 1 (b).

Figure 2:
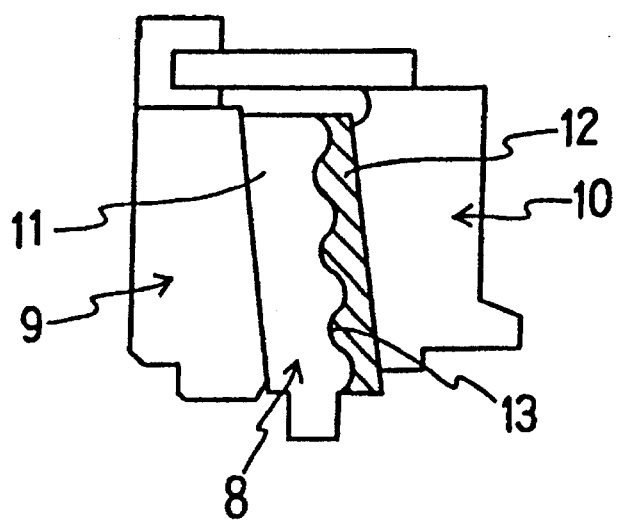
FIG. 2 is a cross-sectional view of an essential part of a multi-cone synchro according to the present invention.

FIG. 2 is a cross-sectional view showing an essential part of a multi-cone-type synchronizer ring which employs a plurality of synchros to reduce the load applied to each synchro and generate a high torque according to an embodiment of the invention. This embodiment employs two synchros (inner ring 9 and outer ring 10) for a cone (intermediate ring) 8, wherein the body 11 of the intermediate ring 8 is made of iron material JIS G 4805 SUJ2 and the sliding member 12 is made of a wear resistant copper alloy material of a specimen C disclosed in table 1. The ring body has a waveform-roughened surface 13 thereon to improve bonding strength between the synchronizer body and sliding member.

Figure 3:
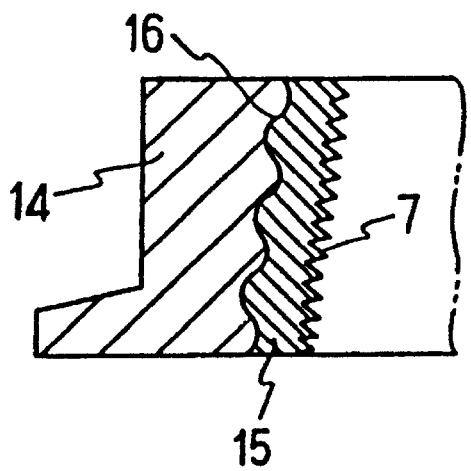
FIG. 3 is a cross-sectional view of an essential part of a Borg-Warner-type synchro according to the present invention.

FIG. 3 is a cross-sectional view of an essential part of a Borg-Warner-type synchro, which is the synchro most in use recently and has a sliding surface on the inner circumference thereof, according to an embodiment of the present invention. In FIG. 3, denoted at 14 is a synchro body, 15 is an internal circumference side sliding member and 16 is a waveform-roughened surface of the synchro body 14. In the case of a synchro of this type, when the copper alloy material is bonded to the internal circumference thereof at a high temperature, the copper alloy material shrinks more than the iron material at a normal temperature so that the sliding member is liable to drop off.

Accordingly, in case of a synchro of such a type, if optimal hot working temperatures in a non-oxidizing atmosphere such as $N_2$, Ar, etc. for the synchro body made of iron material and the sliding member made of wear-resistant copper alloy material are respectively set so that the expansion amounts thereof may be substantially equal to each other and the ring body and sliding member are bonded to each other by way of hot working, it is possible not only to completely prevent drop off at cooling, but also to further increase the bonding strength therebetween. Concrete fabricating methods are described hereinafter. Heating and working are performed in a non-oxidizing atmosphere to prevent iron from oxidation (generation of scale).

(1) Hot forging method (A) A pin-type synchro (sliding member: external circumference side of the ring body)

Figure 4A:
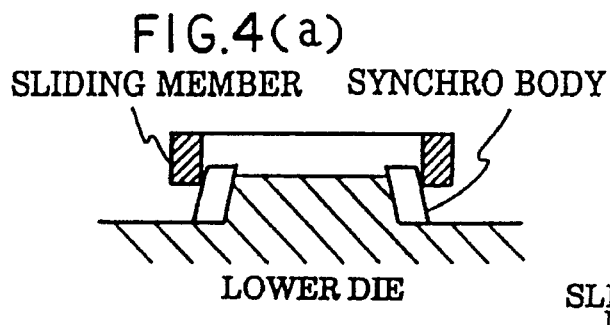
Figure 4B:
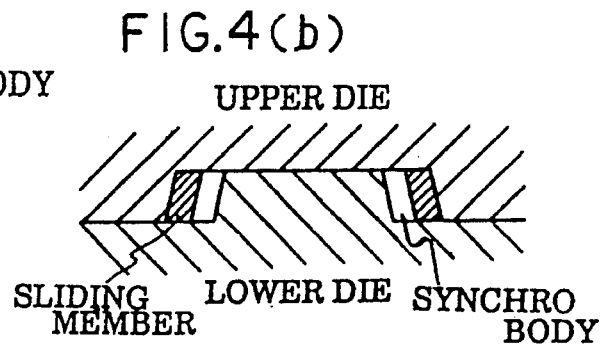

(A multi-cone-type synchro is similar too)

a: Set an Fe material constituting a synchronizer ring on a lower die and then set a wear-resistant copper alloy material serving as a sliding member according to the present invention thereon, the wear-resistant copper alloy material having been heated to a proper temperature (FIG. 4 (a)).

b: Then subject the ring body and sliding member to forging by way of an upper die to bond them to each other and form them into a synchronizer ring. (FIG. 4 ((b)).

(B) Borg-Warner-type synchro (sliding member: internal circumference side of the ring body)

a: Make the Borg-Warner-type synchro of JIS G 4105 SCM-420 material.

b: Make a forging blank of a wear-resistant copper alloy material for sliding according to the invention.

c: Heat the Fe synchro fabricated in process a to 980° C. in an $N_2$ gas atmosphere heating furnace.

d: Heat the copper alloy material forging blank made in process b to 650° C. in a heating furnace.

e: Preheat a forging die to 150° C.

f: When each material reaches a predetermined temperature, at first, set the Fe synchro with the sliding surface thereof upward. At that time the die is sealed in $N_2$ gas.

g: Set the copper alloy material forging blank onto the sliding member of the Fe synchro.

h: Check a match at each portion, then rapidly forge the two materials to bond them to each other.

(2) unit abrasion test

A pin-type iron synchronizer ring was made of JIS G 4805 SUJ2 material and various specimens in Table 1 were bonded to the sliding member thereof according to the hot forging method described above. These synchronizer rings were subjected to a unit abrasion test under the conditions in Table 2 together with reference synchronizer rings to which a phenol resin material was bonded and those to which specimens were bonded according to various methods of shrink fitting, brazing and press fitting. The result is shown in Table 3. Since the result of the abrasion test exclusively depends on a sliding member, the test was omitted regarding other types of synchros.

(3) Sampling load test

Figure 5:
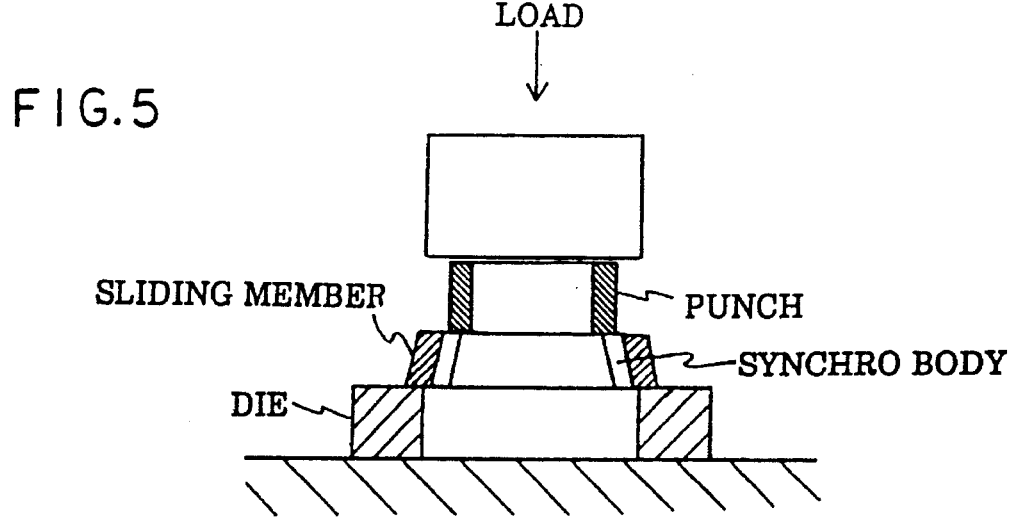
FIG. 5 is a cross-sectional view of the synchro for explaining a sampling load test.
Figure 6:
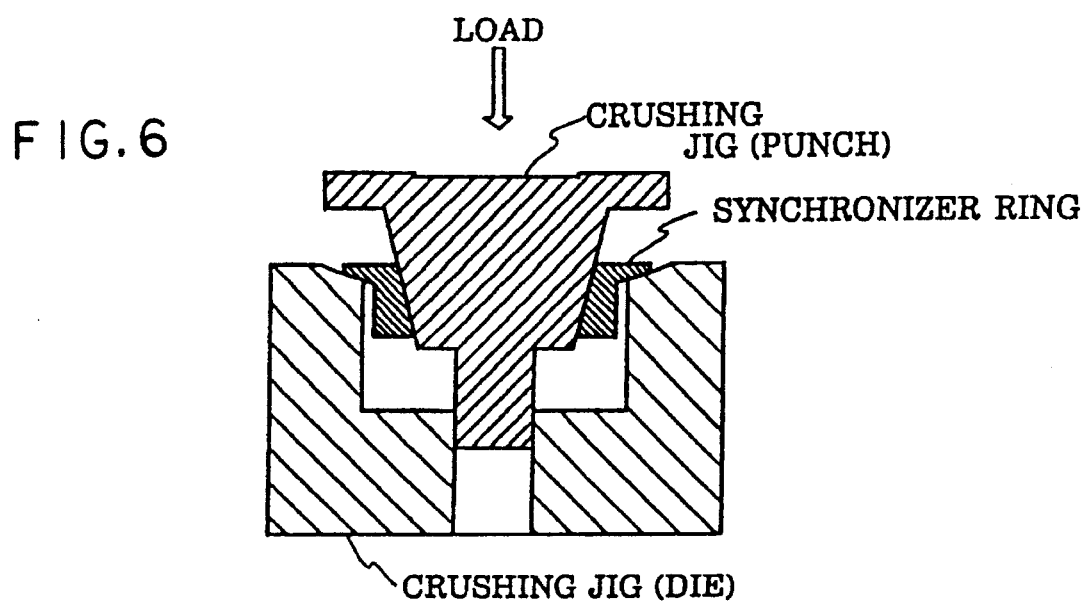
FIG. 6 is a cross-sectional view of the synchro for explaining a crushing test.
Figure 7:
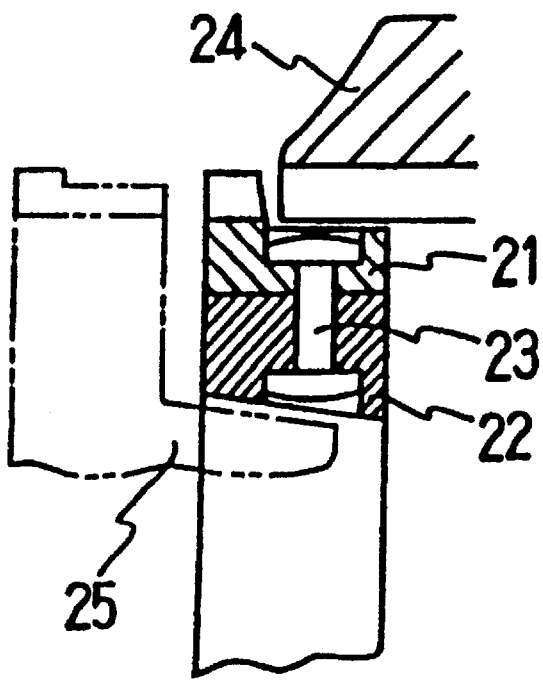
FIG. 7 is a cross-sectional view of a synchro for explaining a conventional bonding method using screws.
Figure 8:
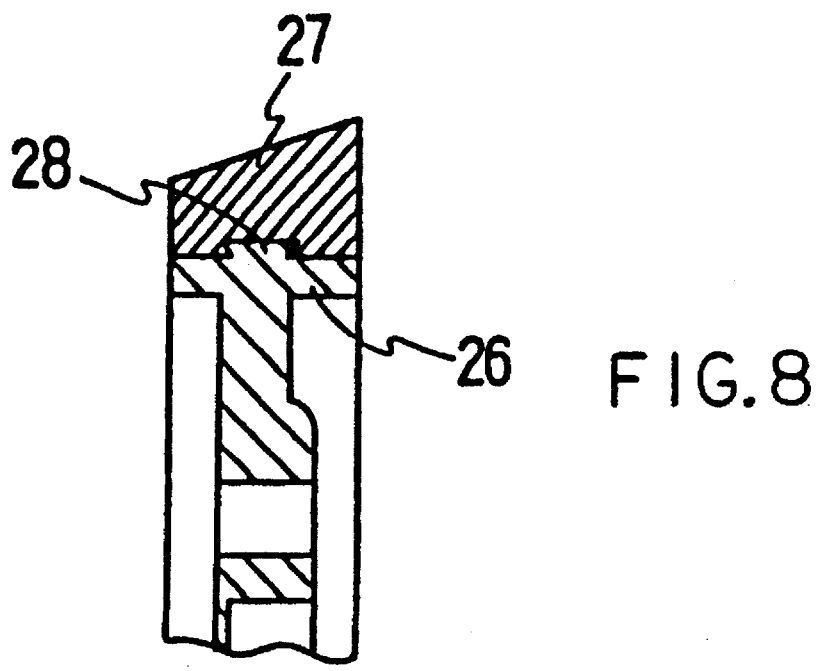
FIG. 8 is a cross-sectional view of a synchro for explaining a conventional bonding method by way of caulking.

The various materials employed in this embodiment and reference materials which have been subjected to the above unit abrasion test were further subjected to a sampling load test according to a method illustrated in FIG. 5. The result is shown in Table 4.

(4) Crushing strength

In order to confirm the strength of a synchronizer ring according to the embodiment of the present invention, a simple copper alloy synchronizer ring made of the specimens shown in Table 1 was subjected to a crushing test to be compared with the synchronizer ring according to the embodiment of the invention. The result is shown in table 5.

As described above, according to the present invention, a synchronizer ring body is made of an iron material which is superior in rigidity and strength and a wear-resistant copper alloy material is bonded to the synchronizer ring body on the sliding surface side thereof by way of hot working, such as hot forging and the like, so that it is possible to provide a high performance composite-material synchronizer ring capable of sufficiently withstanding a high load.

A process of hot working can cover both of the binding process and forming process. As a result, it is very advantageous in cost. It is also advantageous since the synchronizer ring can be manufactured irrespective of its size.

Moreover, it is possible to provide a synchronizer ring further improved in bonding strength by roughening the surface of the ring body or providing notched portions on the portions of the ring body bonded to the sliding member.

Particularly in case of the Borg-Warner-type or keyless-type synchronizer ring having a sliding member on the internal circumference thereof, it is possible to prevent separation at the time of cooling by setting respective optimal hot working temperatures for the ring body and sliding member so that the expansion amounts thereof may be substantially equal to each other to increase bonding strength.

TABLE 1

| | Specimen | Cu | Zn | Al | Mn | Si | Fe | Ni | Pb | Co | Ti | Zr | Nb | Sn | P | Matrix | HRB | Note |
|---|---|---|---|---|---|---|---|---|---|---|---|---|---|---|---|---|---|---|
| Examples | A | Bal | 28.0 | 3.5 | — | 0.5 | 1.0 | 4.0 | — | 1.0 | — | — | — | — | — | α + β | 98 | Claim 1 |
| | B | Bal | 32.0 | 5.5 | — | 0.6 | 0.7 | — | — | — | 1.0 | — | — | — | — | β | 98 | |
| | C | Bal | 35.0 | 5.0 | — | — | 1.5 | 1.0 | — | — | 0.4 | — | 0.1 | — | — | β | 100 | |
| | D | Bal | 38.0 | 1.5 | 2.3 | 1.0 | — | — | 0.2 | — | — | — | — | — | — | β | 95 | Claim 2 |
| | E | Bal | — | 10.0 | — | — | 1.0 | — | — | — | — | — | — | — | — | α + β | 85 | |
| | F | Bal | — | 9.0 | — | — | 3.5 | — | — | — | — | — | — | — | — | α + β | 94 | |
| | G | Bal | — | 11.0 | — | — | 3.0 | — | — | — | — | — | — | — | — | α + β | (103) | |
| | H | Bal | — | 10.0 | — | — | 3.0 | 5.0 | — | — | — | — | — | — | — | α + β | 93 | |
| Comparative Examples | I | Bal | 21.5 | 5.5 | 5.0 | — | 4.0 | — | — | — | — | — | — | — | — | β | 90 | ※1 |
| | J | Bal | — | 2.8 | — | 1.8 | — | — | 0.4 | — | — | — | — | — | — | α | 90 | ※2 |
| | K | Bal | 22.0 | — | 3.0 | 1.0 | — | — | 6.0 | — | — | — | — | — | — | α | 55 | ※3 |
| | L | Bal | 39.0 | — | — | — | — | — | — | — | — | — | — | 1.0 | — | β | 70 | ※4 |
| | M | Bal | — | — | — | — | — | — | — | — | — | — | — | 9.5 | 0.2 | α | 50 | ※5 |
| Resin | | | | | | | | | | | | | | | | | | Phenol Resin |

※1: Outside the scope of chemical components defined in claim 1
※2: Outside the scope of chemical components defined in claim 2
※3: Matrix outside the scope of the invention
※4: HRB value outside the scope of the invention
※5: Shrink fitting, press fitting and brazing

TABLE 2

Testing Conditions

| ITEM | CONTENT |
|---|---|
| Method | squeezing together intermittently during continuous revolution |
| Number of Revolution | 600 rpm |
| Squeezing Load | 150 Kgf |
| Frequency of Squeezing | 2,000 times |
| Squeezing Period | load: 0.5 sec, no load: 3.5 sec |
| Lubricating Oil | SAE 80W-90 |
| Temperature of Lubricating Oil | 60° C. ± 5° C. |
| Method of Lubrication | dipping; ½ of the diameter of a synchronizer ring |
| Sliding Material | JIS G 4104 SCr-420H |

TABLE 3

Result of Unit Abrasion Test (Pin-type)

| Sliding Member | Sliding Material | Abrasion Displacement (μm) |
|---|---|---|
| Examples | A | 371 |
| | B | 108 |
| | C | 75 |
| | D | 670 |
| | E | 625 |
| | F | 581 |
| | G | 530 |
| | H | 510 |
| Comparative Examples | I | 773 |
| | J | crack formed in forging |
| | K | crack formed in forging |
| | L | 1130 |
| Resin | phenol | 342 |
| Shrink Fitting | M | 824 |
| Brazing | M | 930 |
| Press Fitting | M | 810 |

TABLE 4

Sampling Load Test

| Sliding Member | Sliding Material (Specimen) | Sampling Load Test (kgf) |
|---|---|---|
| Example | A | 5750 |
| | B | 6050 |
| | C | 7200 |
| | D | 6200 |
| | E | 5100 |
| | F | 5850 |
| | G | 5700 |
| | H | 6390 |
| Comparative Examples | I | 5500 |
| | J | crack formed in forging |
| | K | crack formed in forging |
| | L | 3700 |

TABLE 5

Crushing Strength

| Construction of Synchro | Specimen | Crushing Load (kgf) |
|---|---|---|
| Synchro of the Invention | A | 4190 |
| Synchro of Copper Alloy Alone | A | 2550 |
| | B | 2520 |
| | C | 3220 |
| | D | 2860 |

What is claimed is:

1. In a method of attaching a synchronizer ring comprising a ring body made of an iron material to a sliding member made of a wear-resistant copper alloy, the improvement comprising said ring body being bonded to said sliding member by hot forging at a roughened surface of said ring body, said wear-resistant copper alloy:

(1) containing 22–45 wt. % Zn, 0.1–15 wt. % of at least one metal element selected from the group consisting of Al, Mn, Fe, Pb, Ni, Be, Si, Co, Cr, Ti, Nb, V, Zr, Mo, Sn, Bi and B, with the balance being Cu and inevitable impurities;

(2) having a matrix of α-phase+β-phase, β-phase alone or βphase+γ-phase; and (3) a HRB value of more than 80.

2. A process for attaching a synchronizer ring to a sliding member according to claim 1, characterized in that optimal hot forging temperatures for said ring body made of an iron material and sliding member made of wear-resistant copper alloy material are respectively set so that the expansion amounts thereof may be substantially equal to each other in a non-oxidizing atmosphere of $N_2$, Ar or a reducing gas.

3. A process for attaching a synchronizer ring to a sliding member according to claim 2, characterized in that said synchronizer ring is a Borg-Warner synchronizer ring or a keyless synchronizer ring having a sliding member on the internal circumference thereof.

4. The method of claim 1, wherein said wear-resistant copper alloy contains Al and at least one metal selected from the group consisting of Mn, Si, Fe, Ni, Pb, Co, Ti, Zr and Nb.

5. In a method of attaching a synchronizer ring comprising a ring body made of an iron material to a sliding member made of a wear-resistant copper alloy, the improvement comprising said ring body being bonded to said sliding member by hot forging at a roughened surface of said ring body, said wear-resistant copper alloy:

(1) containing 3–15 wt. % Al, 0.1–15 wt. % of at least one metal element selected from the group consisting of Zn, Mn, Fe, Pb, Ni, Be, Si, Co, Cr, Ti, Nb, V, Zr, Mo, Sn, Bi and B, with the balance being Cu and inevitable impurities;

(2) having a matrix of $\alpha$-phase+$\beta$-phase, $\beta$-phase alone or $\beta$-phase+$\gamma$-phase; and (3) a HRB value of more than 80.

6. A synchronizer ring according to claim 5, characterized in that optimal hot forging temperatures for said ring body made of iron material and sliding member made of wear-resistant copper alloy material are respectively set so that the expansion amounts thereof may be substantially equal to each other in a non-oxidizing atmosphere of $N_2$, Ar or a reducing gas.

7. A synchronizer ring according to claim 6, characterized in that said synchronizer ring is a Borg-Warner synchronizer ring or a keyless synchronizer ring having a sliding member on the internal circumference thereof.

8. The method of claim 5, wherein said wear-resistant copper alloy contains Fe.

9. The method of claim 5, wherein said wear-resistant copper alloy contains Fe and Ni.

* * * * *